May 31, 1960 M. O. MILLER ET AL 2,938,593
COMBINATION SOUND-DEADENING AND GAS-PURIFYING APPARATUS
Filed Oct. 14, 1957 3 Sheets-Sheet 1
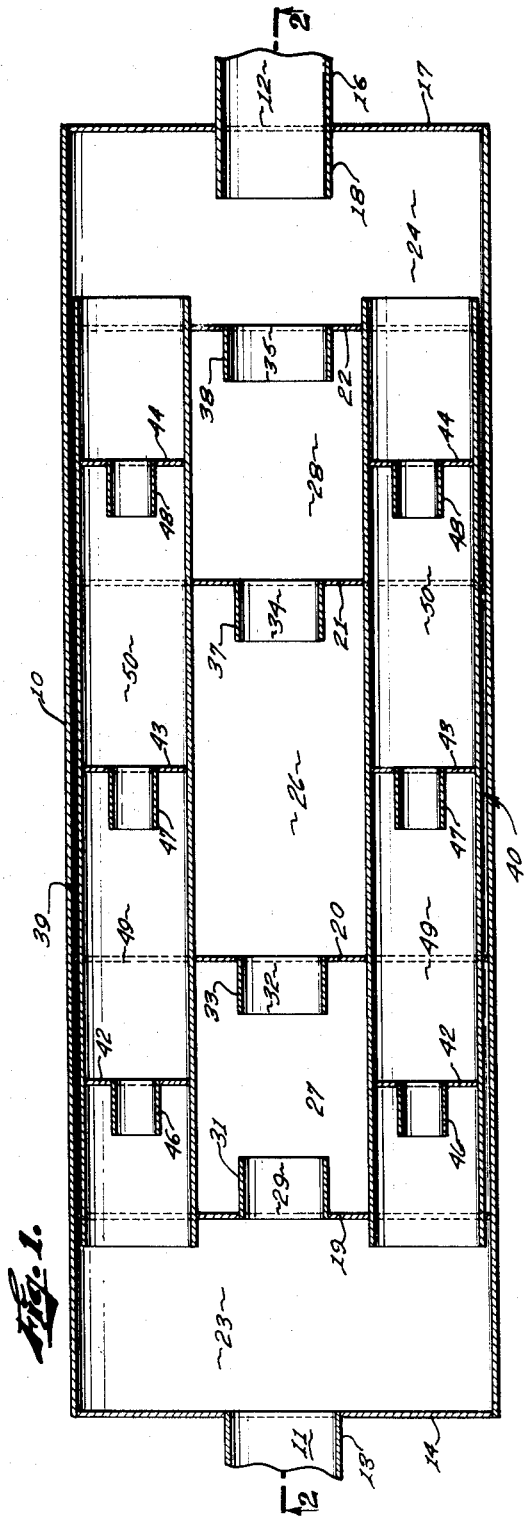
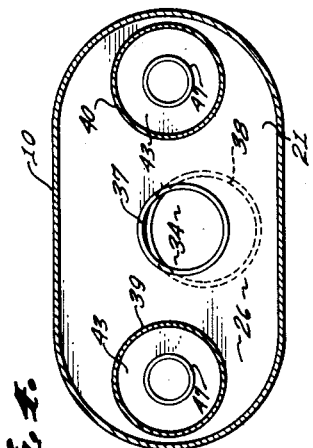
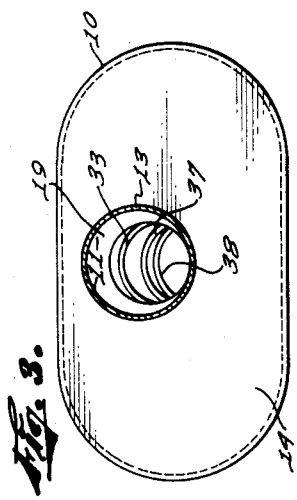
MERAL O. MILLER
JAMES L. MATHENY
RAYMOND L. SCOTT
INVENTOR.
BY
ATTORNEY May 31, 1960
M. O. MILLER ET AL
2,938,593
COMBINATION SOUND-DEADENING AND GAS-PURIFYING APPARATUS
Filed Oct. 14, 1957
3 Sheets-Sheet 2
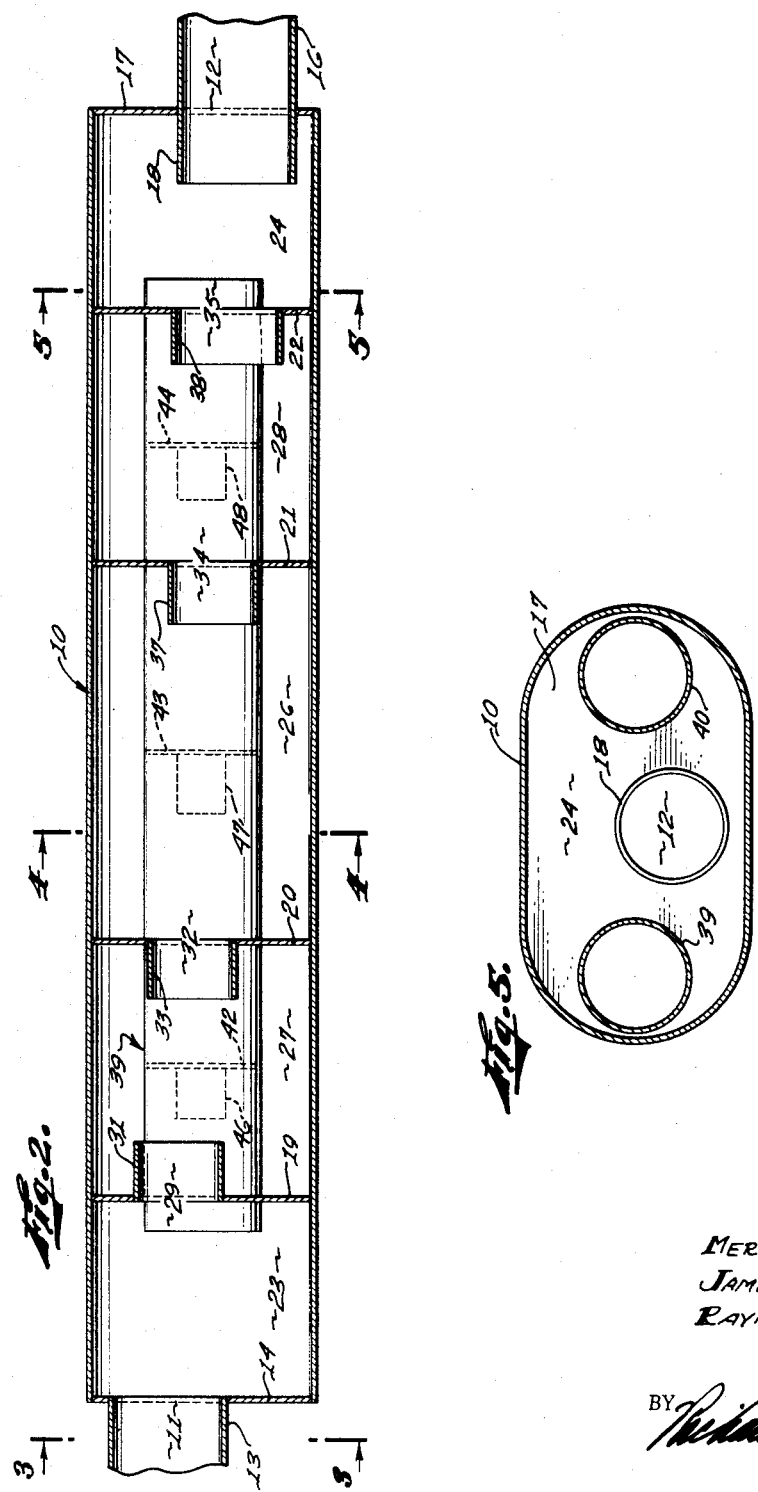
MERAL O. MILLER
JAMES L. MATHENY
RAYMOND L. SCOTT
INVENTOR.
BY 
ATTORNEY

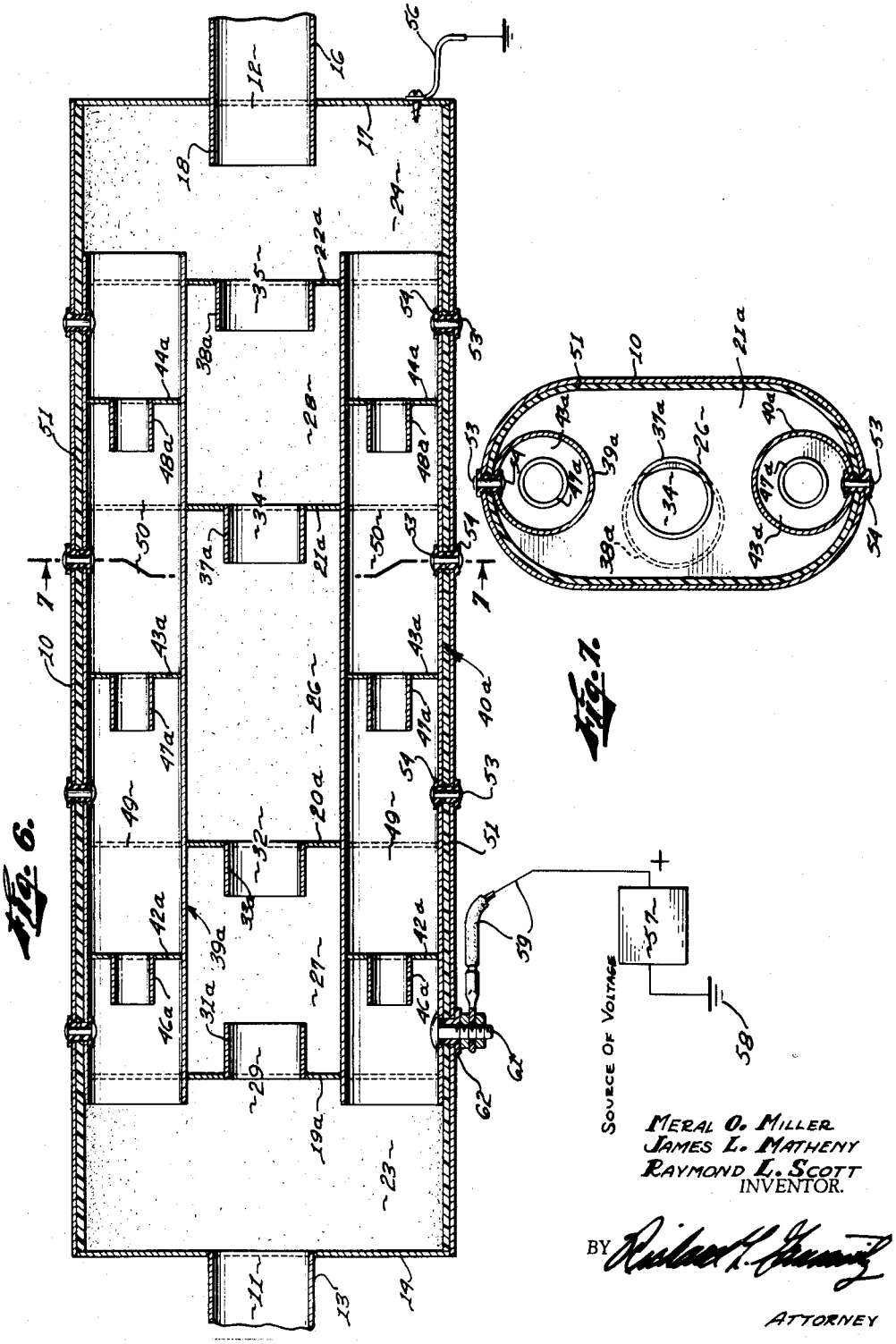

United States Patent Office 2,938,593
Patented May 31, 1960

2,938,593
COMBINATION SOUND-DEADENING AND GAS-PURIFYING APPARATUS

Meral O. Miller, 3793 Arizona St., San Diego, Calif., James L. Matheny, 1505 Raymar St., Santa Ana, Calif., and Raymond L. Scott, 2373 Polomar Ave., Ventura, Calif.

Filed Oct. 14, 1957, Ser. No. 690,102

6 Claims. (Cl. 181—46)

This invention relates to gas-purifying apparatus for vehicle exhausts, as well as industrial applications, in combination with sound-deadening apparatus having a low back-pressure characteristic.

Because of the great increase in the severity of air pollution problems in recent years, particularly in areas such as Los Angeles County which are characterized by low average wind velocity and a temperature inversion, there has been a large amount of activity in the field of gas-purifying apparatus for automobile exhaust pipes, factory smoke stacks, etc. There has not heretofore been produced, however, a practical gas purifier or "smog muffler" which is sufficiently economical, effective, and long lasting to warrant incorporation thereof on the millions of vehicles and thousands of factories in a particular smog area.

In attempting to solve problems both of air pollution and sound reduction, previous workers in the field have frequently resorted to apparatus which created a very substantial resistance to the flow of gas therethrough. The great increase in back pressure, caused by such resistance to gas flow, had the effect of reducing the efficiency of engines with which the apparatus was associated.

In view of the above and other factors characteristic of prior art sound-deadening and gas-purifying apparatus, it is an object of the present invention to provide a highly practical, efficient and effective muffler and gas purifier which produces a high degree of noise reduction and air pollutant elimination, yet creates substantially no back pressure.

A further object of the invention is to provide a gas purification or smog-reduction apparatus which is simple and economical to construct and use, yet is extremely effective and long lasting in removing air pollutants from gases passed therethrough.

An additional object is to provide a sound muffling apparatus which produces substantially no back pressure, yet is extremely efficient in reducing not only the sound level but the sharpness and other annoying characteristics of the exhausts of vehicles such as trucks, buses and automobiles.

These and other objects and advantages of the invention will be more fully set forth in the following specification and claims, considered in connection with the attached drawings to which they relate.

In the drawings:

Figure 1 is a horizontal sectional view taken longitudinally of a muffler constructed in accordance with a first embodiment of the invention;

Figure 2 is a vertical central sectional view of the muffler;

Figure 3 is an end elevation of the inlet end of the muffler, as viewed from station 3—3 indicated in Figure 2;

Figure 4 is a vertical central sectional view of the muffler, taken on line 4—4 of Figure 2;

Figure 5 is a section on line 5—5 of Figure 2;

Figure 6 is a horizontal sectional view illustrating a gas-purifying and noise-reducing apparatus constructed in accordance with a second embodiment of the invention, and embodying electrical supply elements which are schematically illustrated; and Figure 7 is a sectional view taken on line 7—7 of Figure 6.

Proceeding with a description of the first embodiment, shown in Figures 1–5, the invention is illustrated as incorporated in a muffler adapted to be connected in the exhaust pipe of a vehicle such as truck, bus, or automobile. The muffler includes an outer shell or casing 10 having an inlet 11 at one end and an outlet 12 at the other. Inlet 11 comprises a cylindrical or tubular pipe 13 which is suitably connected to one end wall 14 of the shell, whereas outlet 12 comprises a pipe 16 connected to the other end wall 17 of the shell. Outlet pipe 16 has a portion 18 which extends into the shell 10 for purposes to be described hereinafter. It is to be understood that the various elements of the muffler are suitably secured together, such as by brazing or welding, unless specifically noted.

The shell 10, which is oblong in cross-sectional shape, encloses a core which includes a plurality of correspondingly shaped partitions or baffles numbered 19–22, inclusive. The exact positioning of the partitions 19–22 is governed by the displacement and other characteristics of the engine with which the muffler is associated. In the illustrated form, the spacing between the two central partitions 20 and 21 is relatively great in comparison to the spacing between such central partitions and the respective adjacent partitions 19 and 22, and also in comparison to the spacing between the respective partitions 19 and 22 and the adjacent end walls 14 and 17.

The inlet end wall 14 and the first partition 19 define between them an inlet end chamber 23. Correspondingly, the outlet end wall 17 and the fourth partition 22 define between them an outlet end chamber which has been numbered 24. Partitions 20 and 21 define (together with the interior wall of shell 10, in each instance) a central chamber 26, and partitions 19—20 and 21—22 define, respectively, intermediate chambers 27 and 28. It is to be understood that the number of intermediate chambers may be varied and that, as previously stated, the exact sizes of the chambers and the spacings between the partitions may be varied in accordance with the characteristics of the particular engine.

The described chambers communicate with each other through openings in the central portions of the various partitions or baffles 19–22, such openings being provided with stub pipes as will next be described.

The central opening in the first partition 19 is numbered 29, and is enclosed by a first stub pipe 31 which extends toward the outlet end of the muffler. The opening 32 in the second partition 20 is associated with a second stub pipe 33 which extends toward the inlet end of the muffler, or in the opposite direction from the first stub pipe 31. Openings 34 and 35, in partitions 21 and 22, respectively, are provided with stub pipes 37 and 38 which extend in the same direction as stub pipe 33, that is to say toward the inlet end of the muffler.

Pipes 31, 33, and 37 are illustrated as having substantially equal diameters, whereas pipe 38 on partition 22 is shown as being substantially larger in diameter. The diameters of the previously described stub pipes are all, however, comparable to the diameter of the exhaust pipe or conduit in which the muffler is mounted. In the illustrated embodiment, the inlet pipe 13 is located at a substantially higher elevation than outlet pipe 16, and intermediate pipes 31, 33, 37 and 38 are stepped progressively downwardly so that a relatively straight central flow path is provided between the inlet and outlet ends of the muffler.

The length of each stub pipe is not great, being shown as substantially less than half of the distance between the partitions of the chamber in which such stub pipe is disposed. In the illustrated form, pipes 31 and 32 each have a length of about one-quarter the length of chamber 27, pipe 37 has a length on the order of one-seventh the length of the chamber 26, and pipe 38 has a length on the order of one-quarter the length of chamber 28. It is pointed out that pipe 38 should not extend substantially into chamber 24, and that pipe 31 should not extend substantially into chamber 23.

It is an important feature of the invention that the exhaust gases in travelling between inlet 11 and outlet 12 pass not only through partition openings 29, 32, 34, and 35, but also through separate conduit means which extend directly between inlet and outlet chambers 23 and 24 and independently of the intermediate chambers 26-28. These conduit means comprise a pair of elongated pipes or conduits 39 and 40 which extend generally parallel to the axis of the muffler and spaced apart on opposite sides of the various central openings in the partitions. More specifically, each pipe 39 and 40 extends through the various partitions 19-22, but is substantially sealed to the partitions so that the gases can only enter the intermediate chambers 26-28 through the central openings 29, 32, and 34. The diameters of the pipes 39 and 40 are preferably comparable to or slightly larger than the diameters of the inlet and outlet pipes 13 and 16.

Mounted in each of the pipes 39 and 40 are three spaced baffles or partitions 42-44, each of which is centrally apertured and associated with a stub pipe 46-48, respectively. The stub pipes 46-48 are illustrated as having diameters about half of the diameters of the conduits 39 and 40 in which they are mounted, and each extends toward the inlet end of the muffler.

The internal baffles and pipes in conduit 39 correspond to those in conduit 40. The various baffles 42-44 are shown as being spaced equal distances apart, with the central baffle 43 located at about the center of the muffler. The remaining baffles 42 and 44 in pipes 39 and 40 are spaced inwardly from the ends of such pipes, being disposed, respectively, radially adjacent the center portions of chambers 27 and 28. Both ends of each pipe 39 and 40 are shown as extending into the main end chambers 23 and 24 of the muffler. In summary, it is pointed out that the partitions 42-44 are disposed, respectively, at the central portions of chambers 27, 26 and 28.

It is to be understood that the exact spacing between the various partitions 42-44, and also the longitudinal position of the pipes or conduits 39 and 40 relative to partitions 19-22, may be adjusted in accordance with the characteristics of the particular system in which the muffler is incorporated.

It is pointed out that there are only three baffles in each conduit 39 and 40 connecting the end chambers 23 and 24, whereas there are four baffles 19-22 through which the gases must flow (via openings 29, 32, 34, and 35) while travelling the central path between the end chambers 23 and 24. Stated in another way, the gases flowing through pipes 39 and 40 must pass through two chambers, numbered 49 and 50, whereas the gases flowing through the central openings (in parallel with gas flow through pipes 39 and 40) must pass through three chambers 26-28. The number of chambers in each of the elongated conduits 39 and 40, which may be termed phase-shift conduit means, is thus one different from the number of main or large chambers in the muffler, excluding the end chambers 23 and 24. This aids in providing a phase-shifting or damping effect to substantially reduce the audible noise level as will be indicated hereinafter.

*Operation of the embodiment of Figures 1-5*

The operation of the muffler may best be understood with reference to the action of the exhaust gas as it flows between inlet 11 and outlet 12. It is to be understood that the exhaust gas when entering the inlet 11 is in the form of a series of whirling balls, puffs, or slugs, there being one slug for each explosion so that the frequency varies with the speed of the engine and other factors. These balls or slugs are relatively compressed and hot at the time they pass through the inlet opening 11.

As each slug or ball of gas enters the inlet chamber 23, it expands and is also cooled a considerable amount. Much of the expanding gas tends to flow radially outwardly to fill the chamber 23, and then to loop or spiral radially inwardly again until a substantial proportion thereof passes through the first stub pipe 31 into intermediate chamber 27. As soon as the gas enters chamber 27, an additional expansion and cooling action occurs, and much of the gas again loops outwardly and then inwardly to pass through the second stub pipe 33 into central chamber 26. This action repeats, with continued expansion, cooling and spiralling or looping actions, until the gas passes through opening 35 into the outlet end chamber 24. The gas then expands and cools further in such outlet chamber 24, after which it passes radially inwardly and then out the outlet pipe 16.

It has been found that the mounting of the stub pipes 33, 37 and 38 in positions extending toward the inlet end of the muffler has the effect of causing the gases to circulate more effectively in the chambers 27, 26 and 28, thereby enhancing the expansion, cooling, and other desirable effects mentioned above. However, it has been found that the first stub pipe 31 should extend toward the outlet end of the muffler instead of into the first or inlet chamber 23. This is because the amount of sound reduction effected by the muffler is less where the stub pipe 31 extends into chamber 23 instead of into chamber 27. Furthermore, and very importantly, popping may occur on starting and deceleration if the first stub pipe 31 is not disposed as indicated.

With relation to the inwardly extending portion 18 of outlet pipe 16, it has been found that this portion causes the gas in outlet chamber 24 to fill such chamber to a relatively uniform density. Stated otherwise, because of the presence of portion 18, the gas in chamber 24 tends to fill the same instead of rushing directly out the outlet opening 12. This has the very desirable effect of permitting interaction, as will be described below, with gases flowing through the pipes 39 and 40. The inwardly extending portion 18 has also been found to be effective in eliminating popping noise on starting or rapid deceleration.

In addition to the gas flowing through the openings 29, 32, 34, and 35, between inlet chamber 23 and outlet chamber 24, additional gas flows directly between such chambers through the pipes 39 and 40. Thus, a certain percentage of the gas in inlet chamber 23 flows into the inlet ends of pipes 39 and 40 instead of spiralling centrally back to the opening 29 into chamber 27. Such gas which enters the pipes 39 and 40 is subjected to expansion, cooling, spiralling, and other actions therein as in the case of gas flowing through the various chambers 26-28. Thus, for example, the gas entering pipe 39 will expand through stub pipe 46 into chamber 49, will be subjected to spiralling and cooling effects, and will then expand through stub pipe 47 into chamber 50. Finally, the gas will expand through stub pipe 48 into the outlet chamber 24.

It is pointed out that in addition to the spiral or looping gas flow action above described, a certain proportion of the gas flows straight through the muffler, that is to say directly along a line through openings 29, 32, 34, and 35. Similarly, a certain proportion of the gas flowing through pipes 39 and 40 passes directly from stub pipe 46 to stub pipe 47, and then to stub pipe 48. It is further pointed ou that in each of the chambers 26, 27, 49, etc., the gas which loops or spirals outwardly and then inwardly, as above described, tends to impinge against the straight-through gas in a manner effecting breaking up of the gas slugs so that the noise and resonance is effectively reduced. The outwardly spiralling or looping gas comes against the straight-through gas in an out-of-phase action. The effect of this is that the natural pulsation of the exhaust is reduced because of the out-of-phase cushioning in the various baffle chambers, with resultant great reduction in the sharpness and loudness of the audible noise.

In addition to the above phase-shifting or resonance-reducing (damping) actions, the present muffler creates a very pronounced sound-deadening and resonance-reducing effect in the outlet end chamber 24. As previously indicated, the sizes of the chambers 27, 26 and 28, as well as the shapes thereof, are very different from the corresponding characteristics of the chambers 49 and 50 in tubes 39 and 40. Furthermore, as previously stated, the number of chambers 49 and 50 in each tube 39 or 40 is different from the number of chambers 26–28 between the inlet and outlet chambers 23 and 24. Consequently, gas entering the outlet chamber 24 from the tubes 39 and 40 has different phase and other characteristics than the gas passing through the outlet 35 into the same chamber. The gas flowing through outlet 35 and the gas flowing out the tubes 39 and 40 come together, as previously indicated, to produce a sound-deadening action which has been found to be extremely effective in reducing the loudness and sharpness of the audible noise. As stated above, the inwardly extending portion 18 of outlet pipe 16 has the effect of causing an effective mixing of gases in the chamber 24, as is desired to produce the above-stated results.

In spite of the fact that the muffler is extremely effective in reducing the loudness and sharpness of the noise, it does not create a substantial back pressure and consequent reduction in the efficiency of the engine. By contrast, many conventional mufflers achieve sound deadening by passing the gas through restricted openings, and thus create a large amount of back pressure. Actual tests have shown that the back pressure at the inlet of the present muffler is less than an inch of water at an engine speed of 3,000 r.p.m. This is to be contrasted with conventional mufflers, which produce a back pressure in the range of five to eight inches of water on the same automobile and under the same test conditions.

In addition to creating a sound-deadening effect, it has been found that the above-described muffler produces a certain amount of reduction in the noxious content of the outlet gases. Such reduction is believed to result from the very thorough mixing of the exhaust gases in the muffler, with consequent increased opportunity for oxidation therein. The air pollutant reduction effected by the previously described muffler is not, however, as great as with the embodiment next to be described.

*Embodiment of Figures 6 and 7*

Except as will be specifically indicated, the construction of the muffler shown in Figures 6 and 7 is identical to the muffler illustrated in Figures 1–5. It is to be understood, however, that the electrical and catalytic means incorporated in the second embodiment is also operable with certain different shapes and constructions of baffles or mufflers. Furthermore, it is understood that the electrical and catalytic means of the second embodiment is adapted for use not only in vehicle mufflers, but also in other areas, such as smoke stacks or chimneys, where purification of gas is desired. Insofar as sound deadening characteristics are concerned, however, the present muffler (both embodiments) is particularly designed for use on internal combustion reciprocating engines.

The parts shown in Figures 6 and 7 which correspond to those of the previous embodiment have been correspondingly numbered, except that some numbers are followed by the letter "a."

Partitions 19a, 20a, 21a and 22a in the second embodiment are slightly smaller, in relation to the size of shell 10, than the corresponding partitions 19–22 of the first embodiment. Clearance space is therefore, provided for an electrically insulating and corrosion resisting sleeve 51. The sleeve, which may be formed of suitable heat-resisting and electrically insulating fibre, is shaped correspondingly to the shell 10 and is inserted therein in engagement with the full length of the interior shell surface. The core assembly of the muffler, comprising the partitions and tube elements, is suitably secured to the shell 10 by electrically insulating means. Such means is illustrated to comprise a plurality of rivets 53 which extend through the shell 10 and through the outer portions of the tubes 39a and 40a, such rivets being surrounded by suitable insulating bushings 54.

The core of the muffler shown in Figures 5 and 6 is formed of an electrically conductive substance which will provide a catalytic effect, or ion-exchange effect, with relation to the gases passed through the muffler. It has been found that copper, and alloys containing a substantial proportion of copper, provide the desired results when employed with the electrical means next to be described. The outer shell 10 of the muffler is grounded, as indicated at 56, whereas the core is connected to one side of a source 57 of pulsating or alternating voltage. The other side of source 57 is grounded at 58. The connection between the core and the voltage source 57 may be through a lead 59 which extends to a conductive bolt 61, the head of the bolt being disposed in electrically conductive contact with the interior surface of tube 40a. The bolt is suitably insulated from shell 10 by a bushing 62.

The voltage source 57 may be of any suitable variety adapted to deliver a relatively high voltage and a substantial frequency. For example, it has been found that 12,000 volts of pulsating direct voltage, at a frequency on the order of 50,000 c.p.s., is satisfactory. Also, an alternating voltage of 10,000 volts at a frequency on the order of 800 c.p.s. is satisfactory. In each instance the current is relatively low, for example 0.2 milliamp. The voltage source 57 should be a source of pulsating direct voltage, and the core should be charged positively, as indicated.

According to applicants' best understanding of the theory of operation of the apparatus shown in Figures 6 and 7, the various molecules of gas entering through inlet 11 come into contact with the electrically charged copper core. Such contact, in combination with the turbulence of the gas which is effected as stated above, causes loss of electrons from the gas molecules, the electrons being attracted by the positive core. The result is the formation of ions which subsequently combine with free electrons in a manner forming molecules which, in a large proportion of instances, are different from the molecules entering the muffler. It has been found that methane and carbon monoxide, for example, interact with other gases, such as oxygen, to form innocuous compounds such as water.

In summary, the apparatus illustrated in Figures 6 and 7 operates in a very simple and economical manner to produce a substantial reduction in the air pollutants in the exhaust from an automobile, or an industrial plant. Furthermore, as previously described in detail, the muffler provides a large reduction in the volume and sharpness of the noise, without materially raising back pressure.

It is to be understood that the rivets 53 need not be employed, and that the core may be force fit into the insulating sleeve if desired. The insulating sleeve may also be formed of porcelain, and suitable high-dielectric synthetics.

In addition to copper and copper alloys, which are primarily suited for use in connection with hydrocarbon exhaust gases, certain other electrically conductive catalytic materials may be employed in connection with industrial processes. These include carbon, platinum, gold, cobalt, and zinc. The coating of the above-described core with carbon, as a result of continued use of the muffler, does not destroy the action of the muffler in effecting gas purification.

Various embodiments of the present invention, in addition to what has been illustrated and described in detail, may be employed without departing from the scope of the accompanying claims.

We claim:

1. In a muffler for internal combustion reciprocating engines, elongated shell means having an inlet at one end and an outlet at the other end, partition means provided in said shell means to divide the same into at least three chambers disposed in a series between said inlet and said outlet, said partition means being provided with openings permitting flow of gas through said chambers in series between said inlet and outlet, and conduit means to effect direct communication between two spaced ones of said chambers and independently of at least one intermediate chamber, said conduit means being provided with means dividing the same into communicating chambers the number and characteristics of which are different from the number and characteristics of the main chambers in said shell means and defined by said partition means, whereby gas may flow in parallel through said conduit means and through said openings to come together in a chamber relatively adjacent said outlet and provide a damping or sound-deadening action.

2. A muffler for internal combustion reciprocating engines, including the engines of automobiles, trucks, and buses, which muffler comprises elongated casing or shell means having an inlet at one end and an outlet at the other end, a first partition provided transversely of said shell means relatively adjacent said inlet and defining an inlet chamber between said first partition and said inlet, a second partition provided transversely of said shell means relatively adjacent said outlet and defining an outlet chamber between said second partition and said outlet, said first and second partitions being provided, respectively, with first and second openings permitting series flow of gas between said inlet chamber and said outlet chamber through at least one intermediate chamber, and phase-shifting conduit means extending directly between said inlet chamber and said outlet chamber independently of said intermediate chamber, said phase-shifting conduit means incorporating partition means having openings therein and stub pipes mounted around said openings, whereby gas may flow between said inlet and outlet in parallel through said phase-shifting conduit means and through said intermediate chamber for mixing in said outlet chamber to provide a damping and sound-deadening action therein.

3. A muffler for internal combustion reciprocating engines, which comprises casing means having an inlet at one end and an outlet at the other end, a first partition mounted in said casing means relatively adjacent said inlet and defining therebetween an inlet chamber, a second partition mounted in said casing means relatively adjacent said outlet and defining therebetween an outlet chamber, additional partitions mounted in said casing means between said first and second partitions and defining intermediate chambers therebetween, said partitions being provided with openings having stub pipe elements mounted therearound and extending in only one direction therefrom, and a plurality of pipes or conduits connected between said inlet and outlet chambers and independently of said intermediate chambers, said pipes or conduits being provided with apertured partition means therein and with stub pipes mounted around the apertures and extending in only one direction therefrom, whereby exhaust gas may flow from said inlet to said outlet in parallel through said pipes or conduits and through said openings in said partitions for mixing in said outlet chamber with consequent sound-deadening action.

4. The invention as claimed in claim 3, in which said outlet is provided with a stub pipe extending toward said inlet, and in which the stub pipes on said partitions and partition means extend toward said inlet excepting for the stub pipe on said first partition, said last-named stub pipe extending toward said outlet.

5. The invention as claimed in claim 3, in which said partitions and pipes or conduits are formed with substantial quantities of catalytic material, and in which power supply means are provided to impress a voltage thereon.

6. The invention as claimed in claim 5, in which said catalytic material is copper, and in which said voltage is a relatively high positive pulsating voltage.

References Cited in the file of this patent

UNITED STATES PATENTS

| | | |
|---|---|---|
| 1,698,842 | Estep | Jan. 15, 1929 |
| 2,124,933 | Starkweather et al. | July 26, 1938 |
| 2,166,670 | Martin | July 18, 1939 |
| 2,395,005 | Kuhn | Feb. 19, 1946 |
| 2,511,597 | Marx | June 13, 1950 |
| 2,701,621 | Sprague | Feb. 8, 1955 |

FOREIGN PATENTS

| | | |
|---|---|---|
| 411,807 | Great Britain | Sept. 6, 1932 |
| 822,317 | France | Feb. 22, 1943 |